United States Patent [19]

Wheeler et al.

[11] 4,404,433
[45] Sep. 13, 1983

[54] TELEPHONE CALL MONITORING APPARATUS

[76] Inventors: Leon Wheeler, P.O. Box 998; Glenn A. Beusch, 128 Westwood, both of Post Falls, Id. 83854

[21] Appl. No.: 253,107

[22] Filed: Apr. 13, 1981

[51] Int. Cl.³ ............... H04M 15/08; H04M 15/18; H04M 15/22; H04M 15/30
[52] U.S. Cl. .................................. 179/7.1 TP
[58] Field of Search ........ 179/7.1 R, 7.1 TP, 175.2 A

[56] References Cited

U.S. PATENT DOCUMENTS

| | | | |
|---|---|---|---|
| 3,546,381 | 12/1970 | Foley et al. .................. | 179/7.1 R |
| 3,718,778 | 2/1973 | Anderson ..................... | 179/175.2 A |
| 3,725,947 | 4/1973 | Albertini et al. . | |
| 3,806,652 | 4/1974 | Woolf et al. ................. | 179/7.1 R |
| 4,028,493 | 6/1977 | Brennemann et al. . | |
| 4,045,619 | 8/1977 | Harrington ................... | 179/7.1 R X |
| 4,122,308 | 10/1978 | Weinberger et al. ......... | 179/7.1 R |

FOREIGN PATENT DOCUMENTS

2066621 7/1981 United Kingdom .......... 179/7.1 TP

Primary Examiner—G. Z. Rubinson
Assistant Examiner—Keith E. George
Attorney, Agent, or Firm—Wells, St. John & Roberts

[57] ABSTRACT

A telephone call monitoring apparatus is described for monitoring a subscriber's telephone to determine the time of day in which incoming or outgoing telephone calls are made and the duration of the calls. Additionally the apparatus determines and records the telephone number of the "called" telephone. The apparatus is responsive to the frequency, duration and pause between ring back signals placed on the telephone to determine the estimated time that the call is answered by the called telephone.

17 Claims, 8 Drawing Figures

TELEPHONE CALL MONITORING APPARATUS

BACKGROUND OF THE INVENTION

This invention relates to telephone call monitoring apparatus for monitoring a subscriber's telephone at the subscriber's location.

One of the objects of this invention is to provide a telephone call monitoring apparatus that is capable of efficiently and effectively determining the duration of telephone calls made from the subscriber's telephone and providing printed information concerning the telephone numbers called and the duration of the calls.

A further object of this invention is to provide a very inexpensive telephone call monitoring apparatus that is capable of monitoring a subscriber's telephone to determine the telephone number and the length of period of the calls.

An additional object of this invention is to provide visual display information to the person making a telephone call to indicate the telephone number being called and a running elapsed time of the telephone call and further being able to record the information on printed material.

A still further object of this invention is to provide a telephone monitoring apparatus that is capable of determining the length of time of the telephone call without receiving any signal from the central exchange indicating that the called telephone has been answered.

A still further object of this invention is to provide a telephone call monitoring apparatus that is capable of being connected to the telephone line without adversely affecting the central telephone system or a subscriber's telephone.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
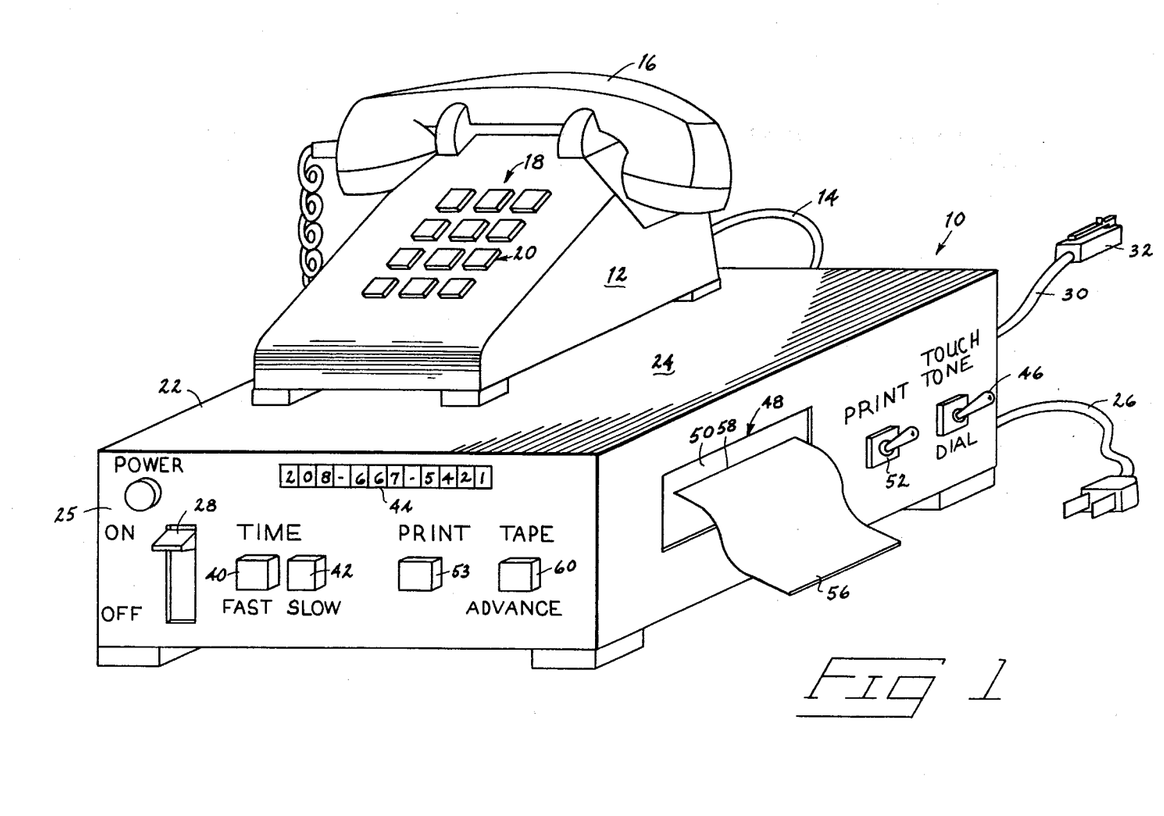
FIG. 1 is an isometric view of the telephone call monitoring apparatus.

Referring to FIG. 1 there is illustrated a telephone call monitoring apparatus generally designated with the numeral 10 for positioning next to or receiving a subscriber's telephone set 12 thereon. The apparatus 10 is connected to a telephone line 14 that connects the subscriber's telephone set to a central telephone system. The subscriber's telephone set 12 has a telephone receiver 16 that normally rests on the telephone set when the telephone is inactive and is utilized (picked up) by the subscriber or the user when making or answering a telephone call defining an "active" state.

The telephone calling set 12 has a telephone number input means generally designated with the number 18 for enabling the user to dial or input a telephone number into the telephone set that is directed to the central telephone system for calling a distant telephone referred to as the "called" telephone.

In the embodiment illustrated, the set 12 includes a Touch-tone keyboard 20 having a series of keys that generate tones when depressed. Alternatively, the input means 18 could include a dial system (not shown).

The apparatus 10 includes a housing 22 that preferably has a surface 24 for receiving a telephone set 12 to enable the telephone set 12 to be positioned immediately on the apparatus 10. In some instances it may be desirable to set the apparatus at a different location at the subscriber's place of business or residence. The housing 22 has a control or display panel 25 for enabling the user to conveniently start and control the apparatus.

The apparatus 10 includes a power input 26 that includes a cord that is connectable to a standard power source such as a 110 AC circuit for providing electrical power to operate the apparatus. An on/off switch 28 is mounted on the control and display panel 25 for turning the apparatus on or off.

Additionally, the apparatus 10 includes a connecting means 30 that connects the apparatus to the telephone line 14. The connecting means 30 specifically includes a telephone jack 32 for connecting either directly into the telephone line or having the telephone set 12 connected to the apparatus and the connecting means 30 connected to the telephone outlet receptacle at the subscriber's location.

Figure 2:
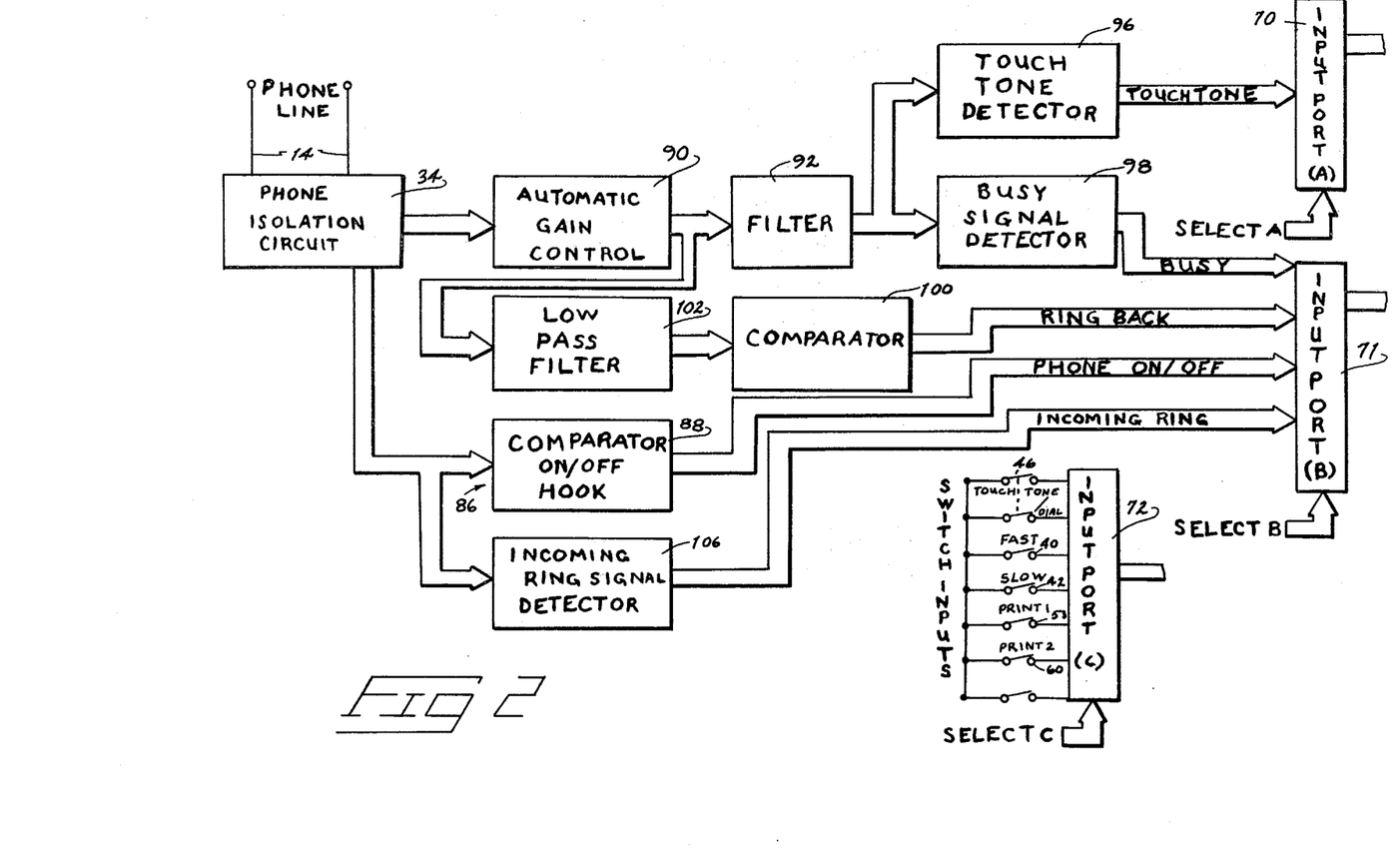
FIG. 2 is a schematic block diagram of major input components of the telephone monitoring apparatus.

The apparatus 10 includes a phone isolation circuit 34, FIG. 2, for preventing the apparatus from having an adverse effect upon the integrity of the telephone connection between the telephone set and the central telephone system. Specifically, the phone isolation unit prevents feedback of signals from the apparatus 10 to the telephone line 14 as per FCC regulations.

Figure 3:
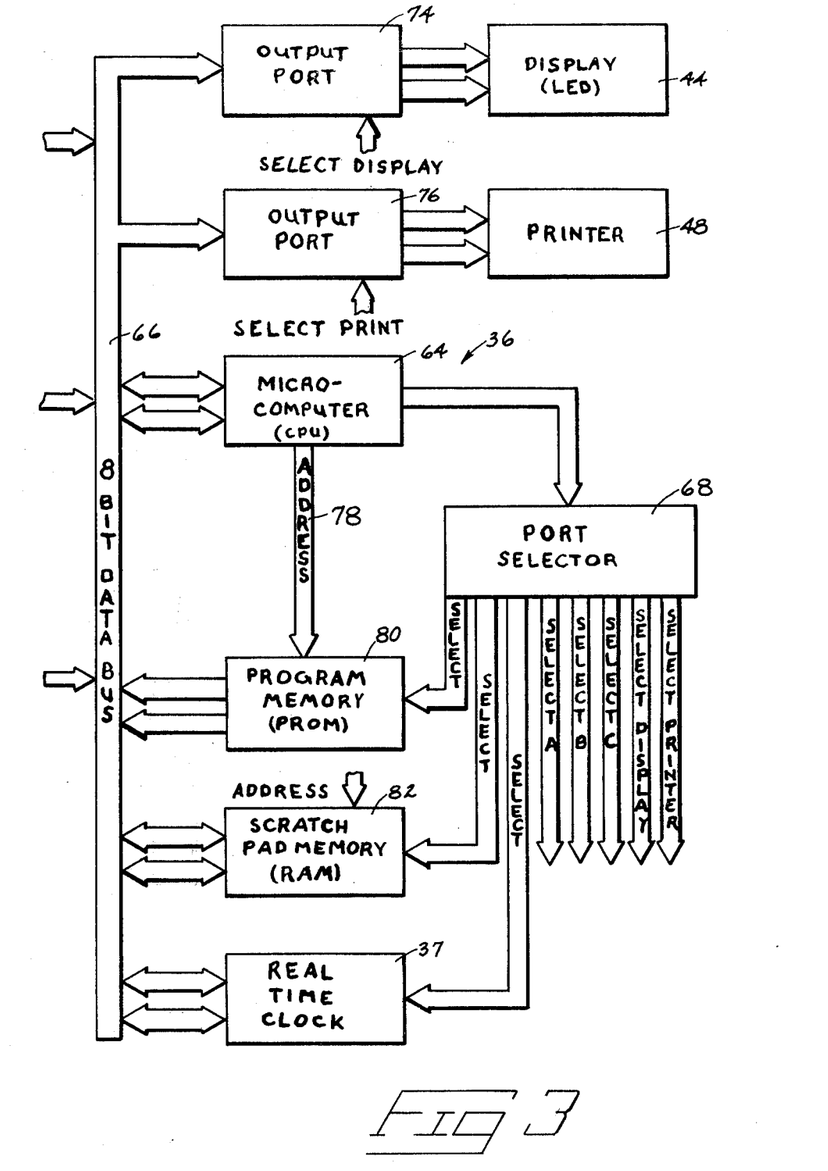
FIG. 3 is a schematic block diagram that integrates with FIG. 2 illustrating microcomputer components and output components that form part of the apparatus.

As illustrated in FIG. 3 the apparatus includes a dedicated microcomputer 36 that is connected to various input and output (I/O) devices controlling their operation in a program sequence to control the functioning of the apparatus 10.

One of the I/O devices includes a time of day means 37 that is in the form of a real time clock that provides time of day information to the microprocessor 36 which is displayed to the user and is printed on a permanent medium when telephone calls are received or dispatched from the telephone set 12. The time of day means 37 includes a pushbutton switch 40 that is mounted on display panel 25 for causing the clock to increment forward in a "rapid" mode when it is desired to change or initially set the clock. Additionally, a pushbutton 42 is provided on the display panel 25 for slowly indexing the real time clock to set the real time clock more accurately after the approximate time is approached by using the fast pushbutton 40.

One of the output devices is a numerical display 44 that is mounted on the display panel 25 for displaying numerical digits including the time of day, telephone number called and elapsed time from the start of the telephone call to the termination of the telephone call. In this specific embodiment, the numerical display is a twelve digit display that is capable of displaying long distance telephone numbers of ten digits with hyphens between the first and second digit and the fourth and fifth digit as illustrated.

Additionally the apparatus 10 further includes a mode selection switch 46 (FIGS. 1 and 2) that is mounted to the housing along a side for setting the apparatus 10 either in a "touch tone" mode or a "dial" mode depending upon the type of telephone number input means 18 provided on the telephone set 12. The mode selector switch 46 inputs information to the microcomputer 36 to select different subroutines within the program depending upon the position of the mode select switch. If the mode select switch 46 is in the "touch tone" mode then the touch tone subroutine program is selected whereas if the mode select switch 46 is in the "dial" position then the dial subroutine program is utilized.

One of the output devices is a permanent recording means 48 for recording the telephone information including the time of day that the telephone call is made, the telephone number of the "called" telephone and the duration of the telephone call. On incoming telephone calls, the permanent recording means provides the time of day that the telephone call is received and the lapsed time or duration of the incoming call. In the preferred embodiment, permanent recording means includes a printer 50 that is mounted within the housing 22. A print "on/off" switch 52 is provided to render the printer either active or inactive. The printer 50 prints legible information onto a tape 56 that exits from an outlet 58 formed in the housing 22.

A tape advance switch 60 and a "print" switch 53 provided on the display panel to enable the user to advance the tape as desired and to print the accumulated information from temporary memory storage.

The dedicated microcomputer or microprocessor 36 includes a central processing unit 64 (FIG. 3) that is connected to the I/O devices through a data bus 66. The CPU 64 communicates or selects the I/O device for operation through a port selector 68. The input devices communicate to the central processing unit 64 through Input Ports "A" designated with the number 70; an Input Port "B" designated with the numeral 71; and Input Port "C" designated with the numeral 72 (FIG. 2).

The CPU 64 communicates to the display unit 44 through an Output Port 74. The CPU 64 communicates with the printed through an Output Port 76.

The microprocessor 36 includes an address bus 78 that communicates between the CPU 64 and a program memory unit (PROM) 80 and a scratch pad memory or temporary memory storage (RAM)82.

One of the input devices includes a telephone status means 86 (FIG. 2) that determines whether or not the receiver or telephone set is active or inactive or "on hook" or "off hook". The telephone status means 86 specifically includes a comparator "on/off" hook unit 88 that is operably connected to the telephone line 14 for determining whether the receiver is "on hook" or "off hook". In many telephone systems, the telephone line has an approximately four to six volt DC voltage on the line when the receiver is "off hook". When the receiver is removed or "on hook" a 50 volt signal is imposed on the telephone line. The comparator 88 measures the voltage on the line and generates an "on hook" signal indicating that the receiver has not been removed and an "off hook" signal if the receiver has been removed. The "on hook" condition is referred to as an "inactive" state or status and the "off hook" mode is referred to as an "active" state or status. The information from the comparator 88 is provided to the Input Port 71 for processing on the data bus to the CPU 64.

The apparatus 10 further includes signal sensing circuits for determining what type of signals or information is placed on the telephone line 14 either by the telephone set or by the central telephone system. Such a sensing system includes an automatic signal gain control 90 for amplifying such signals and noise filters 92 for filtering out spurious signals or noises that may be on the line due to various environmental conditions.

The apparatus 10 includes a decoding means that includes a part of microprocessor 36 in addition to tone or frequency detectors 96 for determining whether or not any of the Touch-tone switches have been depressed. The detectors 96 are specifically designed to be sensitive to the tones or frequencies of the switches of the "touch" tone telephone number input means 18 for generating electrical signals that correspond with the digit switch depressed. The electrical signals are fed to the microprocessor 36 through the input port 70. The microprocessor 36 decodes the signals to determine what telephone number digit is represented by the tone signal and outputs such information to the display 44 and printer 48 in accordance with the internal program of the program memory 80.

In addition, the apparatus 10 includes a busy signal detector 98 that is connected to the filters 92 for sensing when busy signals are on the line 14. The busy signals generally fall into three categories having three distinct frequencies. The categories usually indicate whether the "called" telephone is busy or whether the toll line, if a long distance telephone call is being made, is busy or whether or not the central telephone system itself is overloaded or busy. The busy signal detector 98 then outputs a signal to the input port 71 if any one of the busy signals are detected. This information is processed by the microprocessor and is additionally provided to the display 44 and printer 48.

The apparatus 10 includes a ring back signal detection means that is sensitive to the frequency of ring back signals generated by the central telephone system to the "calling" telephone for generating electrical signals to the input port 71 when ring back signals are placed on the line. The ring back signal detection means includes a low pass filter 102 for filtering out high frequency noise and a comparator 100 is provided to compare the ring back signal voltage with a standard to determine whether or not a valid ring back signal is on the telephone line.

A further input device of the apparatus 10 includes an incoming ring signal detector means 106 that is operatively connected to the telephone line to determine when an incoming call is ringing on the subscribers telephone. When an incoming ring signal is detected, a signal is placed to the input port 71 indicating that the subscriber's telephone is being called.

The program memory 80 utilizes the central processing unit 64 to provide a ring back signal duration timing means for timing the duration that a ring back signal is placed on the telephone line and a timing means for timing the intersignal or the period between the ring back signals to determine whether or not a valid ring back signal has been placed upon the telephone line 14. The timing means are internal to the program memory 80 and central processing unit 64 and respond to the signal received from the ring back signal detection means 100.

As a general discussion of the operation of the apparatus, the CPU continually cycles through a program memory to obtain information from the Input Ports 70, 71 and 72 and processes such information and where dictated provides output information to the display 44 and the printer 50.

When the telephone receiver 16 is "on hook" or inactive, the control system monitors the incoming ring signal detector means 106 to see if there may be an incoming ring signal on the line indicating that the subscriber's telephone set 12 is being called. If a valid ring signal is on the line even though the receiver is on the hook, then the microcomputer determines at what time the receiver is removed indicating that a person has answered the telephone call. A microprocessor internal lapse time timer then is initiated to determine the lapsed time from the time that the receiver is picked up or put "off hook" until the receiver is again placed "on the hook". The time of day and lapse time of the call is presented to the printer 48.

When an outgoing call is made, the status means 86 is interrogated to determine when the receiver is "off hook". Depending upon position of the mode selector switch 46, the apparatus will then look for valid touch tone signals or dial signals and then monitor such signals to see if a valid telephone number has been presented on the telephone line 14 to the central telephone system. Assuming that a valid telephone number has been directed to a central telephone system, the apparatus 10 then will wait to determine whether or not valid ring back signals are imposed on the telephone line. From the ring back signals, the apparatus determines by supposition that the "called telephone" has been answered when the ring back signals are terminated for a sufficient period of time. The apparatus then measures or times the lapsed time between initiation of the call and when the receiver is then placed back "on the hook" indicating the telephone call has been terminated.

The time of day of the telephone call, the telephone number being called and the duration of the time is provided to the printer 48. During the telephone call the lapsed time is provided on the display so that the user can visually see how much time has transpired.

If a busy signal appears upon the telephone line, it will be assumed that the telephone call was unable to be completed. However, information as to the time of day, the telephone number and the fact that a busy signal is on the line is provided to the printer 48.

Figure 4:
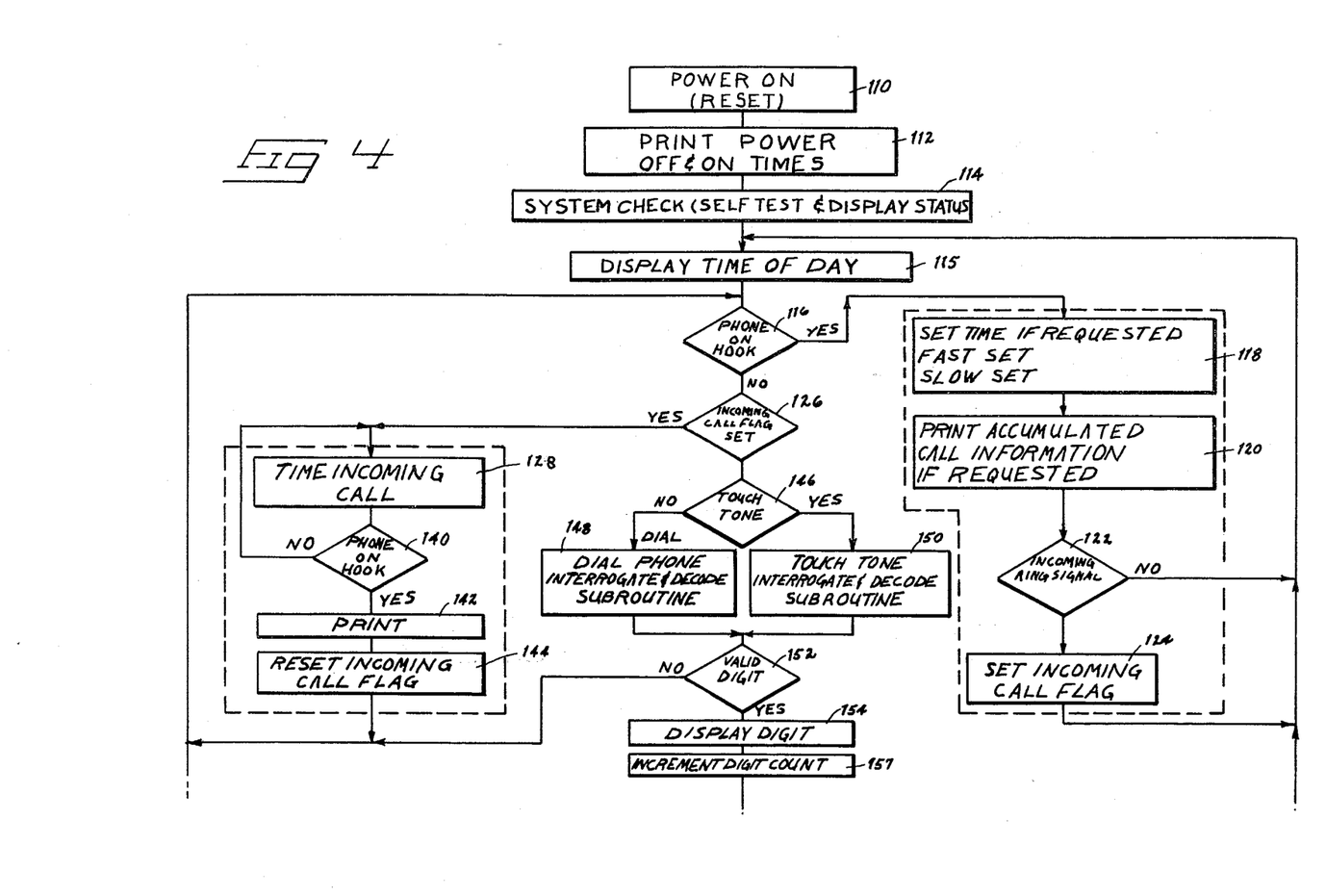
FIGS. 4-8 are control program flow diagrams of the microcomputer in controlling the operation of the apparatus.
Figure 5:
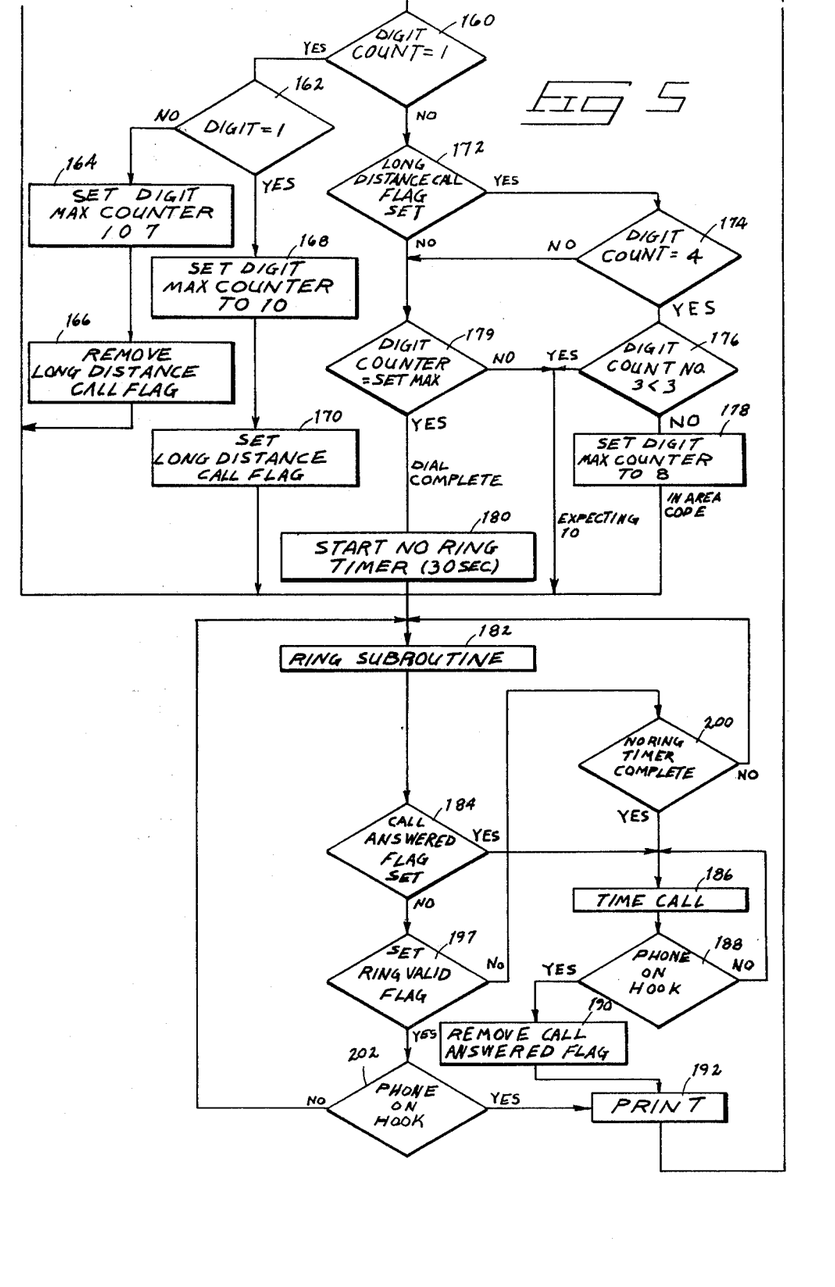

More specifically the operation of the apparatus is illustrated in FIGS. 4-8 in control program flow diagrams illustrating the operating program within the program memory 80. Turning now to FIGS. 4 and 5, there is illustrated the main routine of control program stored in program memory 80 for sequentially operating the apparatus 10. The first is an initialization stage in which the program has a step 110 for checking to determine if the power is "on" to the apparatus. Step 112 outputs information to the printer 48 concerning the time that the power is "off" or "on" so that the user can determine whether or not the apparatus has been unplugged or disconnected. Step 114 involves the system check or initialization for determining the status and operability of the apparatus 10. Once the apparatus has been checked, then the standard sequence begins.

Step 115 involves displaying the time of day on the display 44. The apparatus additionally serves as a time of day digital clock. Step 116 involves checking to see whether the phone is "on the hook". If the phone is "on the hook" step 118 involves setting the time of day if a change is requested by the switches 40 or 42. Usually the switches 40 and 42 would not be depressed so that the sequence would skip to step 120 which would print out all accumulated call information if print button 53 was depressed. The next step 122 determines whether an incoming ring signal is on the line even though the phone receiver is on the hook. If the answer is no then the sequence recycles back and displays again the time of day. If there is an incoming ring signal on the line, then the apparatus skips to step 124 to set an Incoming Call Flag and then returns to step 116.

Assuming that an incoming ring signal has been received, and the person answers the phone, then step 116 would indicate that the phone is "off" the hook, allowing the program to move to step 126 to determine if the Incoming Call Flag had been set. When this occurs, the program moves to step 128 to start timing the incoming call. After the incoming call is timed, then the program recycles to determine when the phone is placed back on the hook at step 140. When the phone is placed on the hook, then the program moves to step 142 to print the lapsed time of the incoming call. Additionally, in step 144 the Incoming Call Flag is reset and the program is returned to step 116.

With respect to outgoing calls, step 116 would indicate that the phone is no longer on the hook and the system would cycle to step 146 to determine whether or not the mode select switch was in the "touch tone" mode or the "Dial" mode. If the switch 46 is in the dial mode then the system moves to step 148 which includes the dial phone subroutine, which is more specifically illustrated in FIG. 6. If the switch 46 is placed in the "touch tone" mode then the program indexes to the "touch tone" subroutine 150 that is illustrated in more detail in FIG. 7. In the subroutines 148 and 150 determination is made of whether a valid telephone number digit has been placed on the line. If the answer is no then the program recycles back to step 116. If the answer is yes, then the program indexes to step 152 to verify that a valid digit has been set. If a valid digit has been set then the program indexes to step 154 to display the digit in the display 44 and to move to step 157 to increment the digit count.

The next group of steps are to verify that a valid telephone number has been dialed and to determine whether or not the number being dialed is for (1) a local call, (2) a long distance call within the same area code or (3) a long distance call outside the area code of the subscriber telephone set. In step 160 as illustrated in FIG. 5 it is determined whether the digit is the first digit in the telephone number. If the digit is the first digit then the program shifts to step 162 to determine if the digit equals numberal "1". If the digit equals numeral "1", it indicates that a long distance telephone call is being made. If a "local" telephone call is being made then digit one does not equal numeral "1" and the program shifts to step 164 to set the digit maximum counter to "7". In step 166, the Long Distance Call Flag is removed and the program is recycled to receive the second digit. If the first digit is numeral "1" then the system moves to step 168 to set the maximum digit counter to "10" indicating that it is a long distance telephone call. The program then sequences to step 170 to set the Long Distance Call Flag. From there the program recycles to receive the next digit.

The subsequent digits pass through step 162 to step 172 to determine if the Long Distance Call Flag is set. If the Long Distance Call Flag has been set then the program shifts to step 174 to determine whether or not the digit count is four. If the digit count is not four then the system recycles until digit count does equal four. When the digit count equals four then the system shifts to step 176 to determine whether the third digit is less than the numeral "3". If the third digit is less than numeral "3", it would indicate that the call is a long distance telephone call to an area outside the area code of the subscriber. If the numeral is greater than "2" it would indicate that it is a long distance telephone call that is within the same area code. Assuming that it is a long distance call within the same area code then the program would skip to step 178 to set the digit maximum counter to 8 digits. The program would recycle until in step 179 it was determined that the number of digits equals the maximum set digits which indicate that the telephone number is complete and valid. At this point the program would initiate the Start No Ring Timer at approximately thirty seconds (Step 180) which would time out if the phone was not placed back on the receiver and there was no valid ring back signal received.

The program moves to a Ring Subroutine step 182 in which it is determined whether valid ring back signals are placed on the telephone line 14 subsequent to the dialing of a valid telephone number. The Ring Subroutine is illustrated in more detail in FIG. 8. During the Ring Subroutine a Called Answered Flag is set assuming that a valid ring back signal was received and terminated. After the Ring Subroutine, the program moves to step 184 to determine if the Called Answered Flag is set. If it is, then the program moves to step 186 to start timing the lapse time of the phone call. The lapse time of the telephone call is continued to be monitored and displayed on the display 44 until the phone is placed on the hook step in step 188. If the phone is then placed on the hook terminating the telephone call, the program moves to step 190 to remove the Call Answered Flag. In step 192 the duration of the telephone call is transmitted to the printer. Additionally, it is placed in memory.

If in step 184, Called Answered Flag is not set then the program proceeds to step 197 to see if the set Ring Valid Flag was set during the Ring Subroutine. If the Ring Valid Flag was not set then the program moves to step 200 to determine if the No Ring Timer set in step 180 is complete. If it is, then the program moves to step 186 to time the call. This assumes that the called telephone was answered prior to any ring signal. In this situation the lapsed time that is measured during this period could be an error of approximately thirty seconds maximum which is acceptable for providing the information to the user.

If in step 197 the Ring Valid Flag was set, then the program will proceed to step 202 to determine if the phone is back on the hook. If the phone is on the hook, it is assumed that the call was terminated prior to the call being completed and this fact will be printed in step 192. If the phone is not back on the hook, the system will recycle to wait for a valid ring signal. After the information is printed, the program cycles back to wait for the next telephone call in step 116.

Figure 6:
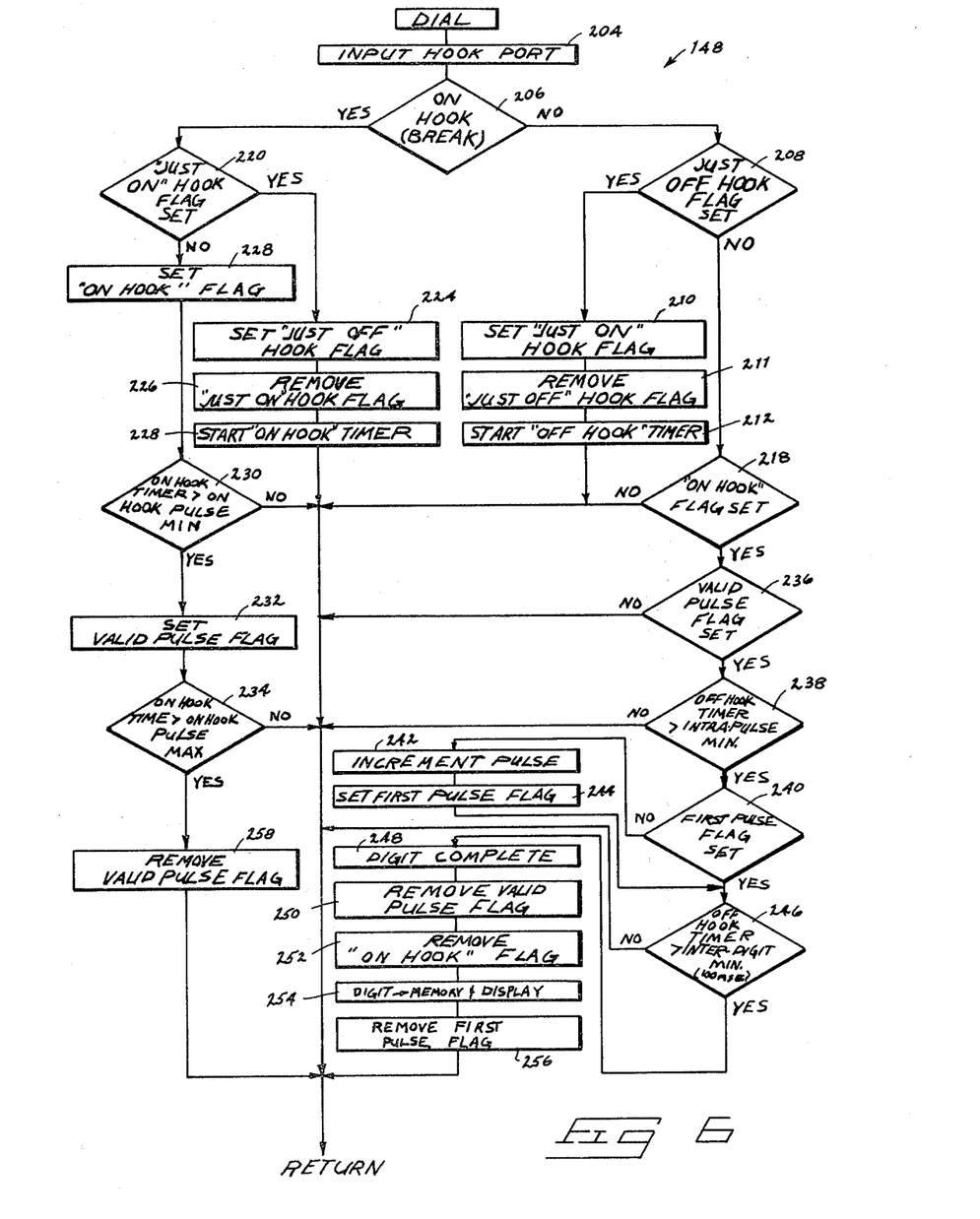

FIG. 6 illustrates the Dial Subroutine 148. The subroutine is initiated with step 204 to input information from the Input Port "B" for processing. Step 204 is succeeded by step 206 to determine whether or not the receiver is "on hook" or "off hook". During the dialing sequence, the "on hook" configuration is also referred to as the "break". Initially, prior to dialing, the user lifts the receiver off the hook causing the program to proceed to step 208 to determine if the "Just Off" Hook Flag is set. Initially it is set and the program proceeds to step 210, 211 and 212 to set "Just On" Hook Flag; remove "Just Off" Hook Flag and start "Off Hook" Timer respectively. During the next cycle through the routine step 208 has a negative response in which the program proceeds to step 216 to determine if the "On Hook" Flag is set. Normally it is and the program then proceeds to step 218 to determine if a Valid Pulse Flag is set. At first the Valid Pulse Flag is not set causing the routine to recycle.

As the dialing begins, the On Hook step 206 detects that an "On Hook" signal is being generated causing the program to proceed to step 220 to determine if the "Just On" Hook Flag is set. During the initial pass through the subroutine the answer is "yes" and the program moves through steps 224, 226, and 228 to set "Just Off" Hook Flag, remove "Just On" Hook Flag and start "On Hook" Timer respectively. During the second pass through the routine, step 208 will indicate a negative response in which the program will proceed to step 228 to set "On Hook" Flag and then proceed to step 230 to determine if the "On Hook" Timer reading exceeds a preset "On Hook" pulse minimum. Initially it does not and so the system will recycle until the "On Hook" Timer value does exceed the "On Hook" pulse minimum. The program then sequences to step 232 to set the Valid Pulse Flag. The program then proceeds to see if the "On Hook" Timer value is greater than a preset "On Hook" pulse maximum. Generally, if the value is greater than the "On Hook" pulse maximum it means that the hook has been placed on the set and the call is terminated. If the value is less than the pulse maximum it means that the pulse width (duration) was correct causing the program to sequence through steps 208 and 218. Because the Valid Pulse Flag was set in step 232, step 236 is positive and the program proceeds to step 238 to determine if the "Off Hook" Timer reading exceeds a preset intra-pulse minimum. If it does not, the program recycles until step 238 indicates a positive responsive before proceeding to step 240 to determine if the First Pulse Flag is set. Initially the First Pulse Flag is not set and the program progresses to steps 242 and 244 to Increment Pulse and to set the First Pulse Flag respectively. During the next and subsequent cycles through step 240 the results are positive and the program sequences to step 246 to determine if the "Off Hook" Timer value is greater than a preset inter-digit minimum value which is generally set at approximately 100 msec. If the value of the "Off Hook" Timer exceeds the inter-digit minimum value, it indicates that a full digit has been dialed and the program sequences to step 248 to indicate that the digit is complete and has been entered. The program then sequences through steps 250, 252, 254 and 256 to remove the Valid Pulse Flag, remove the "On Hook" Flag, move the digit into the display 44 and memory and remove the First Pulse Flag. The dial subroutine is then ready to receive a second digit. If at any time during the sequence, the receiver is placed back "on the hook", the subroutine will terminate when the "On Hook" Timer value exceeds the "On Hook" pulse maximum value in step 234. When this occurs, the program sequences to step 258 to remove the Valid Pulse Flag.

Figure 7:
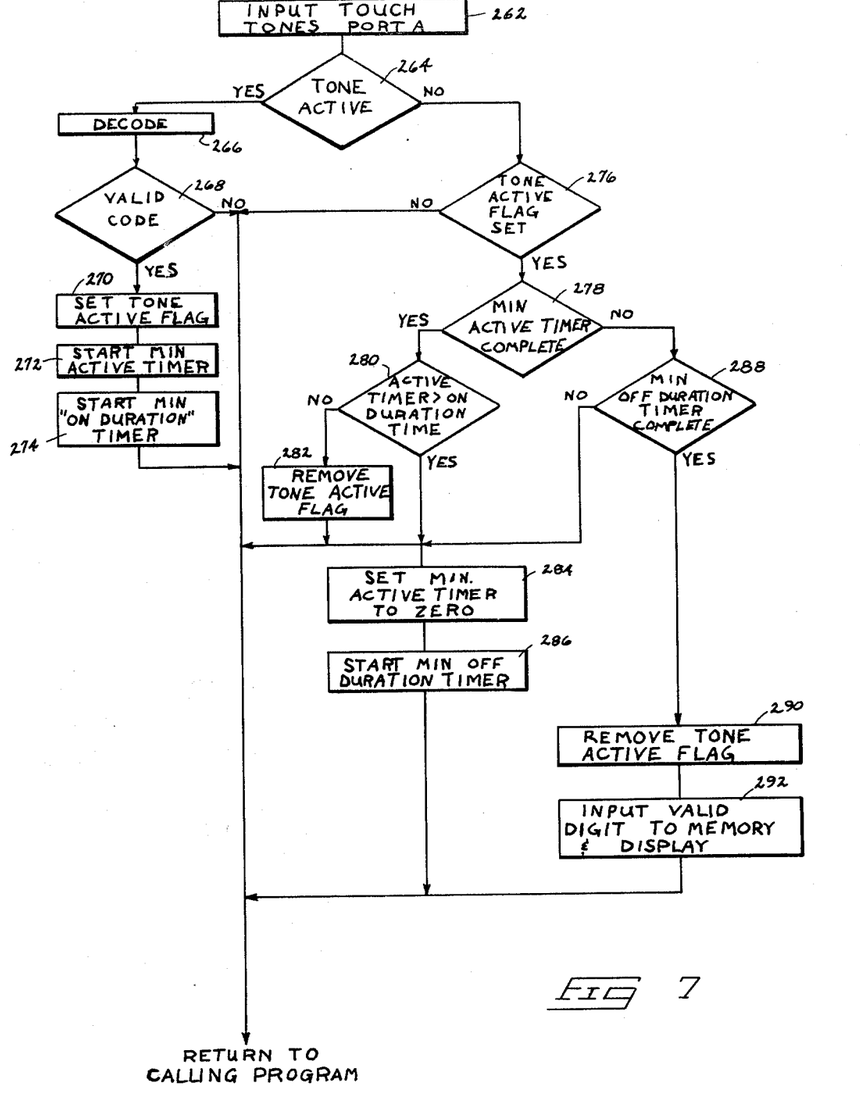

If the "touch tone" mode is selected, the program utilizes the touch tone subroutine 150.

In step 262, program interrogates Input Port A. Step 264 determines if a valid tone signal is provided to Port A. If yes, the tone signal is decoded to step 266. In step 268, it is determined whether a valid code is received. If it is not, the decoded signal meets a valid code, then the program sequences through steps 270, 272, and 274 to reset Tone Active Flag, to start Minimum Active Timer and to start Minimum "On Duration" Timer. As soon as the tone signal terminates, step 264 is negative and the program sequences to step 276 to determine if the Tone Active Flag is set. Since the Tone Active Flag was set in step 270, the program indexes to step 278 to determine if the Minimum Active Timer has timed out to indicate that the tone signal was on for a sufficient period of time to indicate a valid tone. In step 280, the Active Timer is compared against the "On Duration" Time to see if the timer exceeded the standard "Tone On" duration time. If not, the Tone Active Flag is removed in step 282. If it did, the program proceeds in step 284 to reset the Minimum Active Timer back to zero in step 284 and to start the Minimum "Off Duration" Timer 286. During the next cycle, the Minimum Active Timer is not complete in step 278, and the program is sequenced to step 288 to determine if the Minimum "Off" Timer has been completed. If the minimum off time between tone signals is complete, then the program is sequenced through steps 290 and 292 to remove the Tone Active Flag and to input a Valid Digit to memory and display respectively. The program then recycles itself to receive subsequent active tones until a sufficient number is received to present a valid telephone number.

One of the most important subroutines is the ring subroutine identified as step 182. More specifically, the ring subroutine 182 begins with the step 300 (FIG. 8) to interrogate Input Port B to determine if a ring back signal is on the line. In step 302, it is determined whether or not there is a ring back signal on the line. If there is a ring back signal on the line, the program sequences to step 304 to determine whether or not the Ring Signal "Just On" Flag is set. Initially the answer is yes and the program sequences through steps 306, 308, 310 in which the Ring Signal "Just On" Flag is removed, the Ring Signal "Just Off" Flag is set and the Ring "On" Timer "A" is started. As long as the ring back signal is present, the program sequences to step 322 to determine if the Ring "On" Timer A is complete. The Ring "On" Timer A is designed to determine if the signal on the line is more than just noise at the ring signal frequency. When the Ring "On" Timer A is complete in step 322, it is known that a "good" ring back signal is on the line. At this point, the program moves to step 324 to reset the Ring "Off" Timer "B" to zero and moves to step 326 to determine if the Ring Flag is set. During the first pass through the system, the Ring Flag is set and the program sequences through steps 328 and 330 to set the Ring Flag and to start the Ring "On" Timer "B". Ring "On" Timer "B" is designed to add to the time of Ring "On" Timer A a period to determine if the ring back signal duration is sufficient to constitute a valid ring.

Figure 8:
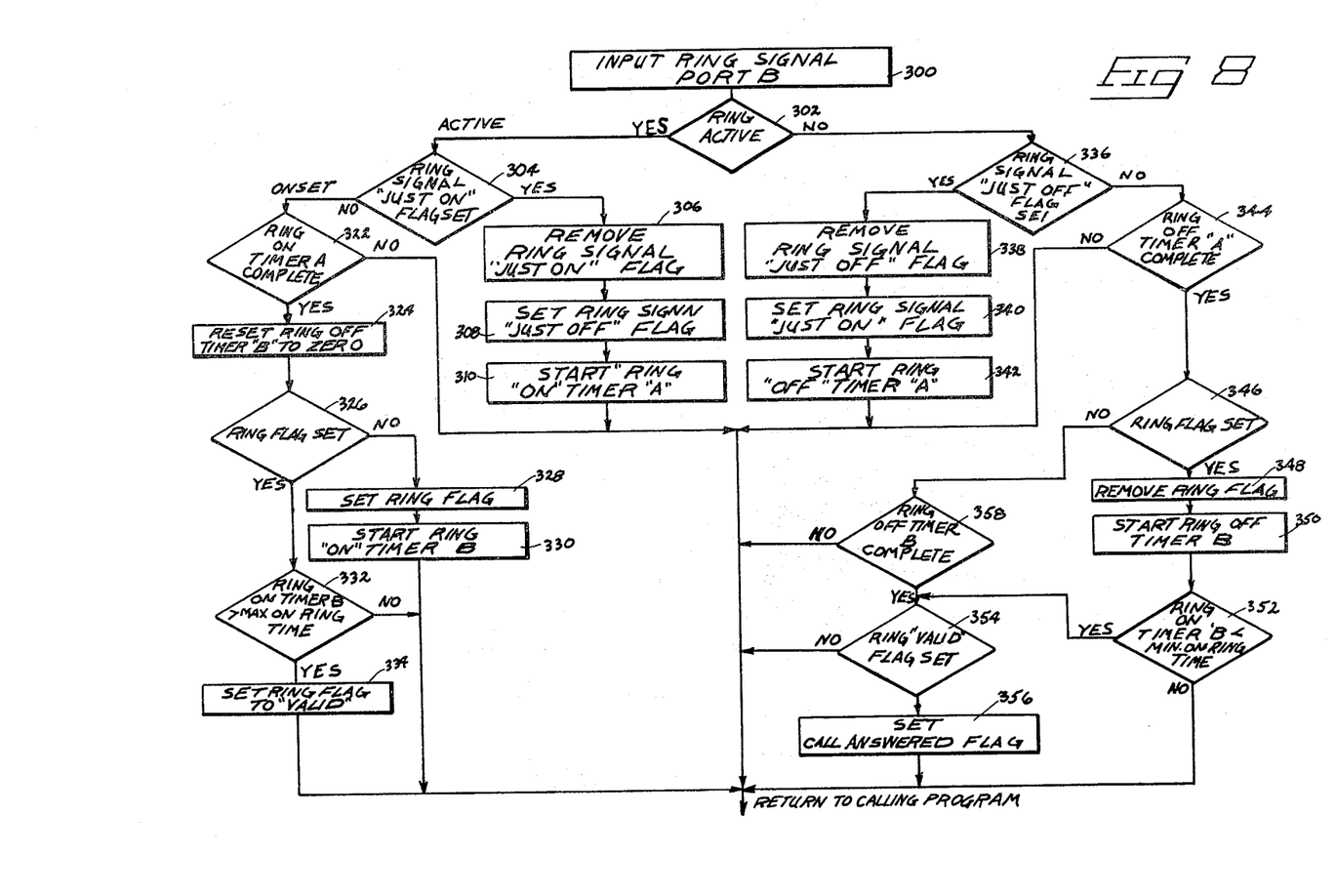

During subsequent cycles, it is determined in step 326 that the Ring Flag is set and the program sequences to step 332 to determine if the Ring "On" Timer "B" is greater than the Max on Ring Time to determine if a full valid ring back signal has been on the line for sufficient time. If the answer is yes, the program sequences to step 334 to set a Ring Flag to "Valid" which means that a full valid ring signal has been received.

The next sequence is to determine the duration of the period or pause succeeding the valid full ring back signal. When the ring back signal is terminated, the program in step 302 determines that there is no ring back signal on the line and the program sequences to step 336 to determine if the Ring Signal "Just off" Flag is set. Initially, it is and the program sequences through steps 338, or 340 and 342 to remove the Ring Signal "Just Off" Flag, set the Ring Signal "Just On" Flag and to start Ring "Off" Timer "A". The Ring "Off" Timer "A" is set to determine if the off period or pause succeeding the ring back signal is more than just a flutter in the ring signal but does constitute a valid pause or off period succeeding a valid on period. The system will cycle to step 344 until the Ring "Off" Timer "A" is complete in which case the program will sequence to step 346 to determine if the Ring Flag is set. If a valid ring back signal has proceeded the off period then the Ring Flag is set and the program sequences through steps 348 and 350 to remove the Ring Flag and to start Ring "Off" Timer "B".

The Ring "Off" Timer "B" is set for a duration that is longer than the normal pause between ring back signals so that when the Ring "Off" Timer B times out it will indicate that the phone has been answered since a subsequent ring signal has not been received. The program then sequences to step 352 to determine if the Ring "On" Timer "B" is less than a minimum on ring time. It is not unusual for the phone to be answered during a succeeding ring back signal. In this situation, step 352 will give a positive result in which the sequence program will move to step 354 to determine if the Ring "Valid" Flag is set. If a previous full length ring back signal has been received, the Ring "Valid" Flag will be set and the program would sequence to step 354 to set a Call Answered Flag indicating that the call had been completed to the destination telephone. If the phone is answered during the dwell or pause period, then step 346 will indicate a negative response and the program will sequence to step 358 to determine if the Ring "Off" Timer "B" is complete which would indicate that pause after a succeeding signal is greater than normal and an anticipated subsequent ring back signal has not been received. This indicates that the phone was answered. From step 358 the program sequences to steps 354 and 356 to set Call Answered Flag indicating that the telephone had been answered.

Assuming that a valid full length ring back signal was on the line, the apparatus will provide a very accurate telephone call duration reading if the telephone is answered during a subsequent ring signal. If the telephone is answered during the pause between ring back signals then the lapsed time determination may be in error up to approximately four seconds. If no valid ring back signal is placed on the line after a valid telephone number was provided, then the lapsed time indicator may be inaccurate up to the value of the "No Ring" Timer (thirty seconds) at the maximum. Any of these possible deviations from the absolute are acceptable in determining or providing to the user the approximate lapse time or duration of the telephone call to the destination telephone.

As can be understood from the above described embodiment, the apparatus is responsive to the frequency, duration and period between ring back signals in determining when the "called" or destination telephone has been answered. The apparatus is not dependent upon receiving a signal from the central telephone system that the called telephone has been answered. Additionally, it is not necessary for the user of the telephone to push a button or to provide information to the apparatus as to when the telephone call was answered.

It should be understood that the above described embodiment merely illustrates the principles of this invention and that numerous other embodiments may be devised by those skilled in the art without departing therefrom. Therefore, only the following claims are intended to define this invention.

What is claimed is:

1. Telephone call monitoring apparatus for monitoring incoming and outgoing telephone calls from a selected telephone to determine: (1) whether the selected telephone is active or inactive; (2) the telephone numbers of called telephones (3) the durations of completed telephone calls to the selected telephone and the called telephones and (4) to record the telephone number to the called telephones and the durations of the completed calls, in which the selected telephone is connected to a central telephone system by a telephone line in which the selected telephone is capable of generating a series of coded electrical signals on the telephone line to the central telephone system representing a desired called telephone number and wherein the central telephone system, in response to receiving the series of coded electrical signals, generates one or more ring back signals on the telephone line corresponding to ring signals made to the designated called telephone to generate one or more audible rings, wherein the ring back signals have a predetermined frequency, duration and period between individual ring back signals, said apparatus comprising:

connecting means operatively connecting the apparatus to the telephone line to receive the signals;

status means for determining whether the calling telephone is active or inactive;

decoding means responsive to the series of electrical signals representative of the desired called telephone number when the calling telephone is active for decoding the series of electrical signals and generating decoded electrical signals corresponding to the desired called telephone number;

ring back signal detection means responsive to the frequency, duration and period between the ring signals for determining when valid ring back signals are generated and then terminated on the line and for generating a telephone answered signal in response thereto;

first call duration means responsive to the ring signal detection means and the status means for determining the lapsed time between the generation of the telephone answered signal and the calling telephone become inactive to estimate the duration of the telephone call to the calling telephone;

an incoming ring signal detection means for determining when an incoming ring signal is on the line;

second call duration means responsive to the incoming ring signal detection means and the status means for determining the lapse time of the selected telephone being active subsequent to the determination that an incoming ring signal is on the line; and recording means operatively connected to the decoding means and the first and second call duration means for recording the telephone numbers of the called telephones and the estimated durations of the completed telephone calls to the called telephones and the selected telephone.

2. The telephone call monitoring apparatus as defined in claim 1 wherein the calling telephone has touch tone keyboard with keyswitches for generating corresponding tone signals having selected frequencies representing telephone number digits and wherein the decoding means includes frequency detectors corresponding to the selected frequencies for sensing when tone signals of the selected frequencies are generated on the line and for generating the decoded electrical signals corresponding to the telephone number digits.

3. The telephone call monitoring apparatus as defined in claim 1 wherein the ring back signal detection means includes signal duration means for determining when a valid ring back signal is generated having a duration approximately corresponding to the predetermined duration.

4. The telephone call monitoring apparatus as defined in claim 1 wherein the ring back signal detection means includes an intersignal means for measuring the period succeeding a ring signal for generating a call answered signal when the measured period exceeds the predetermined period.

5. The telephone call monitoring apparatus as defined in claim 1 wherein the calling telephone has a dial means for generating signals representing telephone number digits in which each signal includes a train of pulses having preset pulse durations and preset interpulse periods and wherein the decoding means includes timing means for measuring the duration of the pulses and the interpulse periods and comparing the measured pulse durations and the interpulse periods with the preset pulse durations and preset interpulse periods to determine when a valid telephone digit is dialed.

6. The telephone call monitoring apparatus as defined in claim 1 wherein the decoding means includes validating means for determining when a valid electrical signal is generated that represents a numerical telephone number digit and wherein the ring signal detection means is rendered effective when a valid decoded electrical signal is generated.

7. The telephone call monitoring apparatus as defined in claim 1 wherein the central telephone system generates a busy signal on the line when the called telephone is active and wherein the apparatus comprises a busy signal means for determining when a busy signal is generated on the telephone line and wherein the recording means records the telephone number called and information that the telephone call was not completed because the called telephone was busy.

8. The telephone call monitoring apparatus as defined in claim 1 wherein the ring back signal detection means includes a ring back signal duration means on the line having the preset ring back signal frequency for determining the duration of a signal and comparing the determined signal duration with the preset duration to determine whether a valid ring back signal is on the line.

9. The telephone call monitoring apparatus as defined in claim 8 wherein the ring back signal detection means includes an intersignal duration means for determining the duration of no signal succeeding a valid ring back signal and comparing the no signal duration to determine whether it equals or exceeds the preset period; and (2) call answered means responsive to the signal duration means and the intersignal duration means for generating the telephone answered signal when the determined no signal duration exceeds the preset period immediately following a valid ring back signal.

10. The telephone call monitoring apparatus as defined in claim 8 wherein the call answered means further generates a telephone answered signal when the duration of a ring back signal is less than the preset duration but immediately succeeding a valid ring signal and valid intersignal period.

11. The telephone call monitoring apparatus as defined in claim 1 wherein the apparatus further comprises an override means responsive to decoding means and ring back signal detection means for generating the telephone answered signal when a preset period of time has lapsed after a series of decoded electrical signals have been generated corresponding to a valid called telephone number even though no valid ring back signal has been detected on the line.

12. The telephone call monitoring apparatus as defined in claim 1 wherein the apparatus further comprises printing means for printing a permanent second record of the number of the called telephones and the estimated duration of each call.

13. The telephone call monitoring apparatus as defined in claim 1 further comprising a visual display means operatively connected to the decoding means and the call duration means for visually displaying the called telephone number and for displaying the lapse time from the generation of the telephone answered signal.

14. Telephone call monitoring apparatus for monitoring outgoing telephone calls from a selected telephone to determine: (1) whether the selected telephone is active or inactive; (2) the telephone numbers of called telephones; (3) the durations of completed telephone calls to the called telephones and to record the telephone numbers and the durations of the completed calls, in which the selected telephone is connected to a central telephone system by a telephone line in which the selected telephone is capable of generating a series of coded electrical signals on the telephone line to the central telephone system representing a desired called telephone number and wherein the central telephone system, in response to receiving the series of coded electrical signals, generates one or more ring back signals on the telephone line corresponding to ring signals made to the designated called telephone to generate one or more audible rings, wherein the ring back signals have a predetermined frequency, duration and period between individual ring back signals, and wherein the central telephone system generates a busy signal on the line when the called telephone is active, said apparatus comprising connecting means operativey connecting the apparatus to the telephone line to receive the signals;

status means for determining whether the calling telephone is active or inactive;

clock means for determining the time of day that the calling telephone is active;

decoding means responsive to the series of electrical signals representative of the desired called telephone number when the calling telephone is active for decoding the series of electrical signal and generating decoded electrical signals corresponding to the desired called telephone number;

ring back signal detection means responsive to the frequency, duration and period between the ring signals for determining when valid ring back signals are generated and then terminated on the line and for generating a telephone answered signal in response thereto;

call duration means responsive to the ring signal detention means and the status means for determining the lapsed time between the generation of the telephone answered signal and the calling telephone become inactive to estimate the duration of the telephone call to the calling telephone;

a busy signal means for determining when a busy signal is generated on the telephone line; and recording means operatively connected to the decoding means, the clock means and the call duration means for recording the telephone numbers of the called telephones and the estimated durations of the completed telephone calls to the called telephones and information that the telephone call was not completed because the called telephone was busy and the time of day in which the busy call was made.

15. The telephone call monitoring apparatus as defined in claim 14 wherein the ring back signal detection means includes an intersignal means for measuring the period succeeding a ring signal for generating a call answered signal when the measured period exceeds the predetermined period.

16. The telephone call monitoring apparatus as defined in claim 14 wherein the apparatus is capable of monitoring incoming telephone calls made to the selected telephone and further comprises:

an incoming ring signal detection means for determining when an incoming ring signal is on the line;

a second call duration means responsive to the incoming ring signal detection means and the status means for determining the lapse time of the selected telephone being active subsequent to the determination that an incoming ring signal is on the line.

17. Telephone call monitoring apparatus for monitoring outgoing telephone calls from a selected telephone to determine: (1) whether the selected telephone is active or inactive; (2) the telephone numbers of called telephones; (3) the durations of completed telephone calls to the called telephones and to record the telephone numbers and the durations of the completed calls, in which the selected telephone is connected to a central telephone system by a telephone line in which the selected telephone is capable of generating a series of coded electrical signals on the telephone line to the central telephone system representing a desired called telephone number and wherein the central telephone system, in response to receiving the series of coded electrical signals, generates one or more ring back signals on the telephone line corresponding to ring signals made to the designated called telephone to generate one or more audible rings, wherein the ring back signals have a predetermined frequency, duration and period between individual ring back signals, said apparatus comprising:

connecting means operatively connecting the apparatus to the telephone line to receive the signals;

status means for determining whether the calling telephone is active or inactive;

decoding means responsive to the series of electrical signals representative of the desired called telephone number when the calling telephone is active for decoding the series of electrical signals and generating decoded electrical signals corresponding to the desired called telephone number;

ring back signal detection means responsive to the frequency, duration and period between the ring signals for determining when valid ring back signals are generated and then terminated on the line and for generating a telephone answered signal in response thereto;

a timing override means responsive to decoding means and ring back signal detection means for generating the telephone answered signals when a preset period of time has lapsed after a series of decoded electrical signals have been generated corresponding to a valid called telephone number even though no valid ring back signal has been detected on the line;

call duration means responsive to the generation of the telephone answered signal and the status means for determining the lapsed time between the generation of the telephone answered signal and the calling telephone become inactive to estimate the duration of the telephone call to the calling telephone; and recording means operatively connected to the decoding means and the call duration means for recording the telephone numbers of the called telephones and the estimated durations of the completed telephone calls to the called telephones.

* * * * *